May 28, 1968     V. H. SCHROLUCKE     3,384,953
AUTOMATIC TOOL CHANGER
Filed Sept. 12, 1966     8 Sheets-Sheet 1
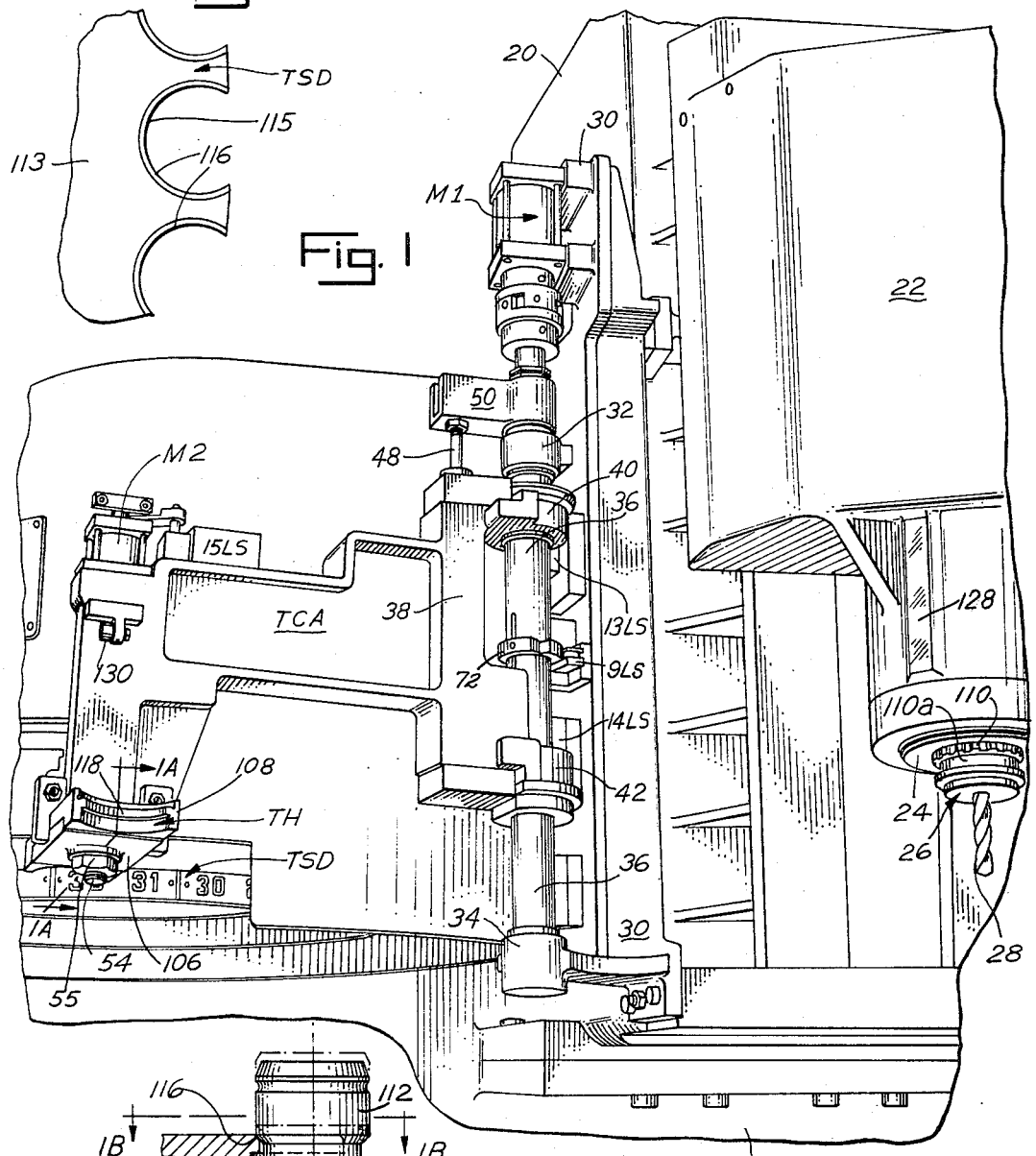
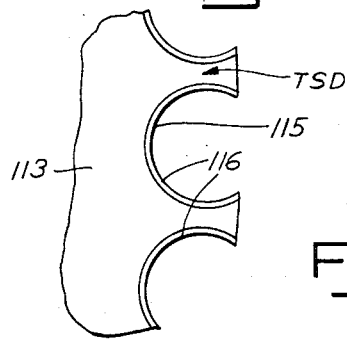
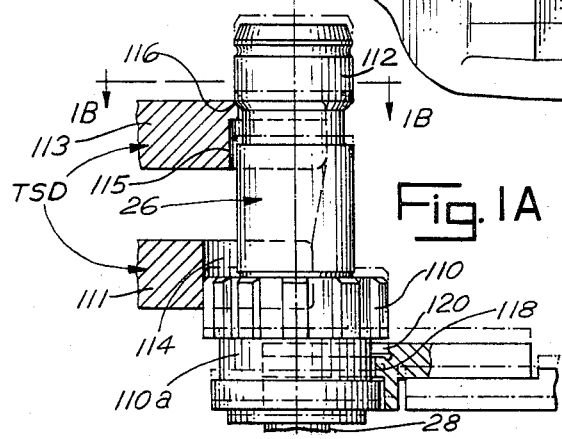
INVENTOR.
VIRGIL H. SCHROLUCKE
BY Bair, Freeman &
Molinare
ATTORNEYS

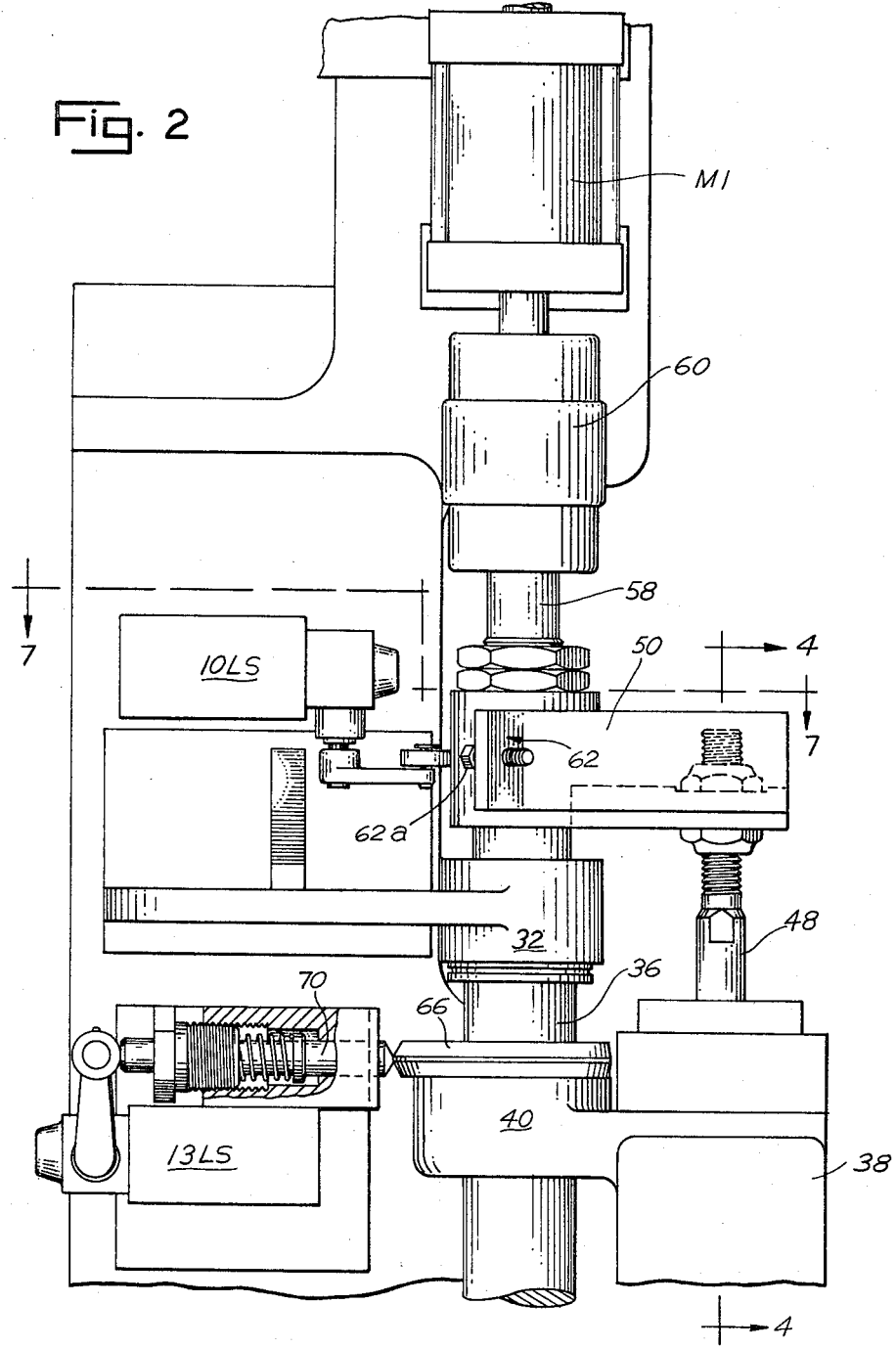

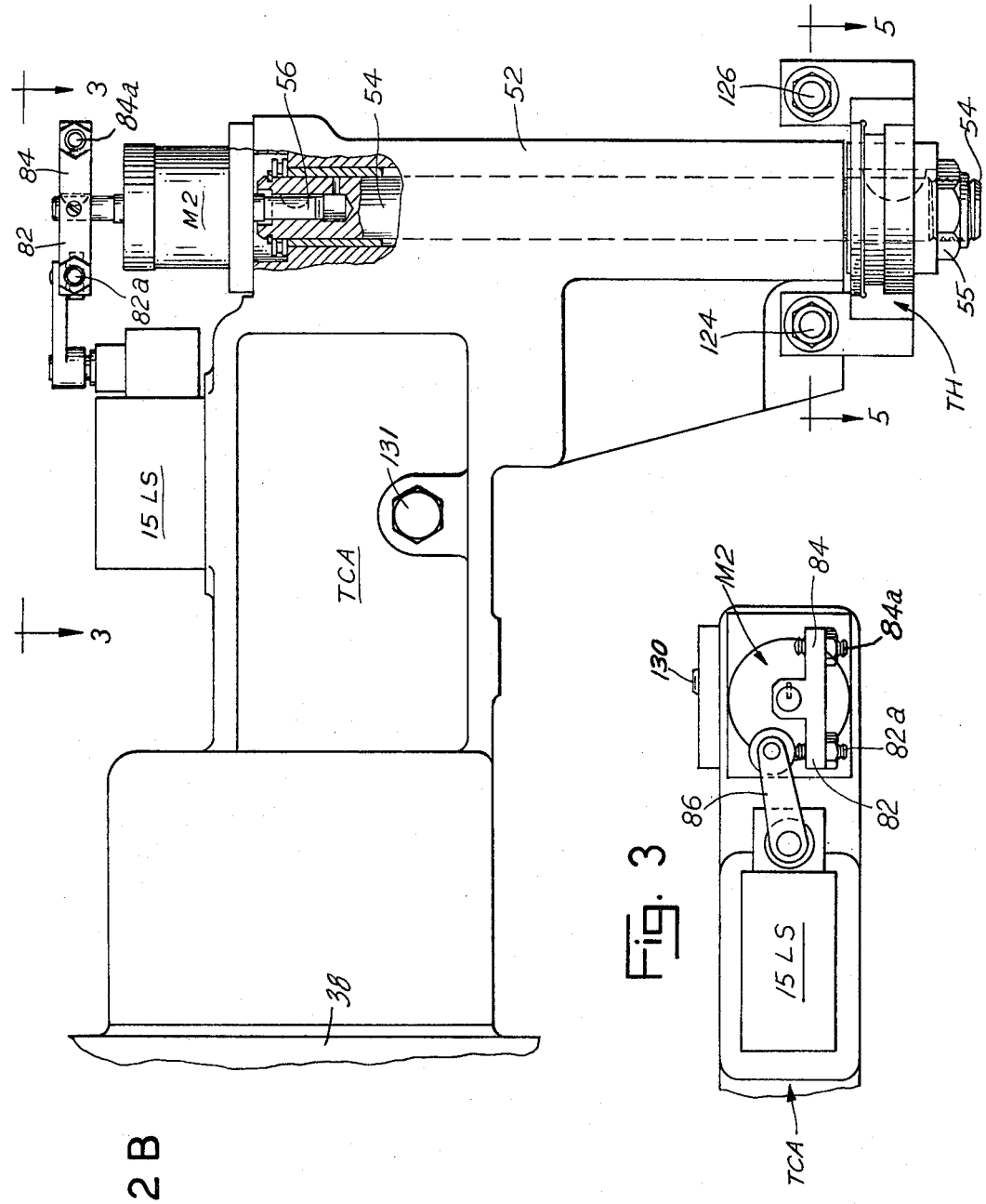

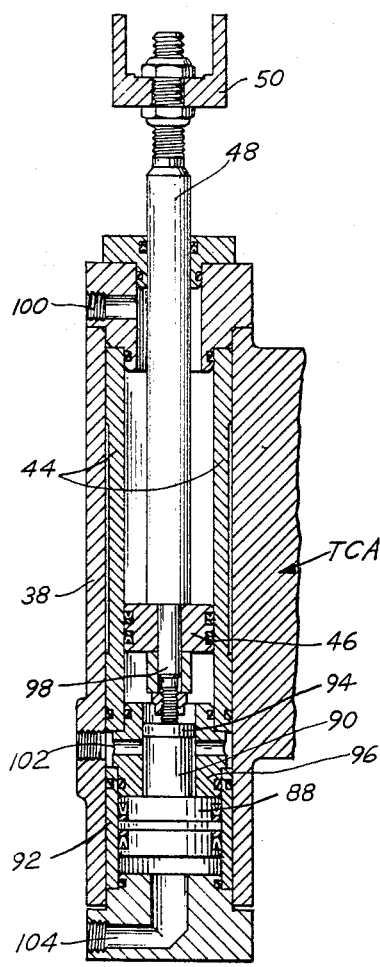
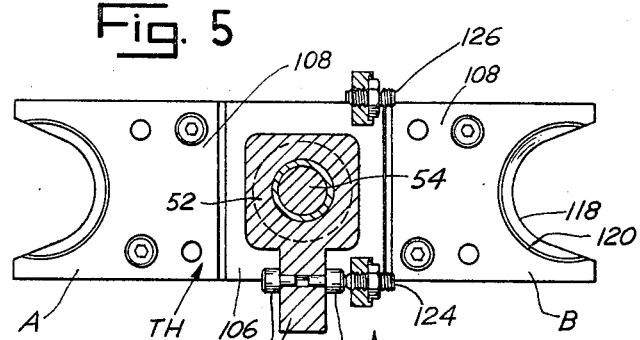
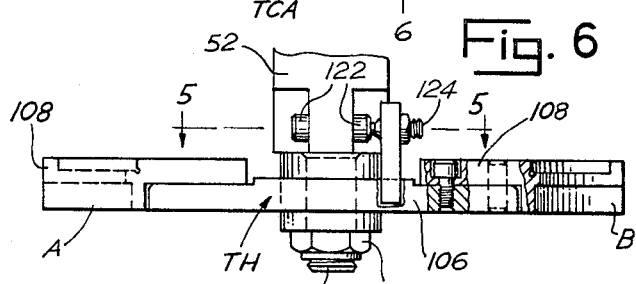
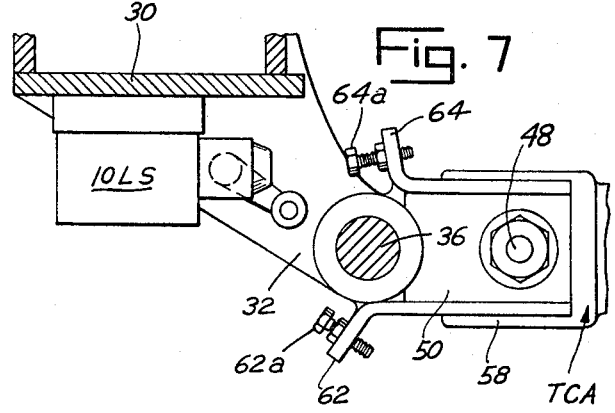
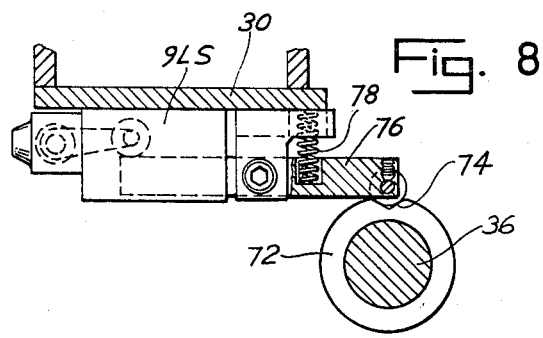
INVENTOR.
VIRGIL H. SCHROLUCKE
BY Bair, Freeman &
Molinare
ATTORNEYS May 28, 1968

V. H. SCHROLUCKE 3,384,953

AUTOMATIC TOOL CHANGER

Filed Sept. 12, 1966

INVENTOR.
VIRGIL H. SCHROLUCKE

BY Bair, Freeman &
Molinare
ATTORNEYS

May 28, 1968 V. H. SCHROLUCKE 3,384,953
AUTOMATIC TOOL CHANGER
Filed Sept. 12, 1966 8 Sheets-Sheet 7
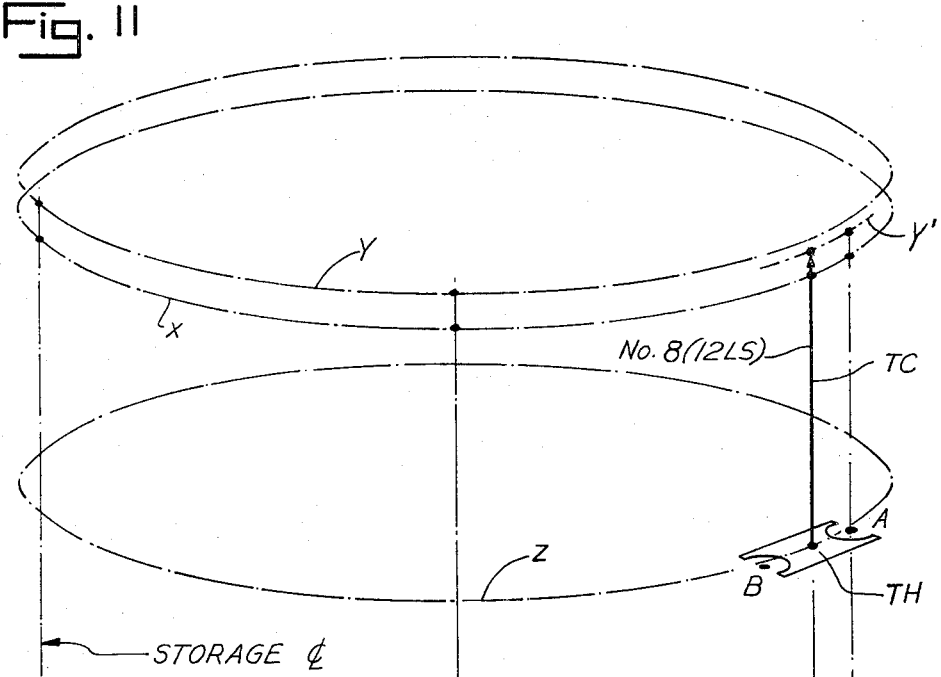
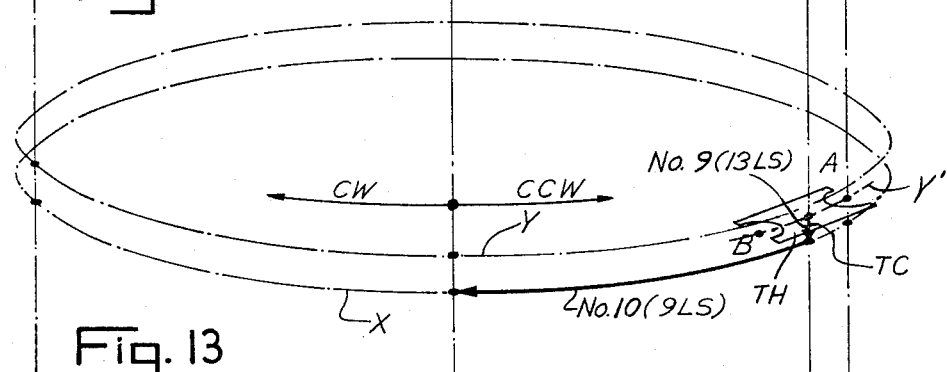
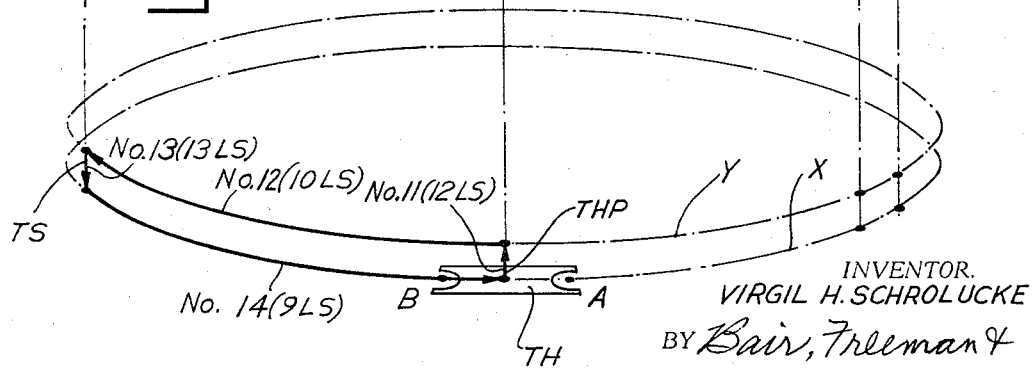
INVENTOR.
VIRGIL H. SCHROLUCKE
BY Bair, Freeman &
Molinare
ATTORNEYS

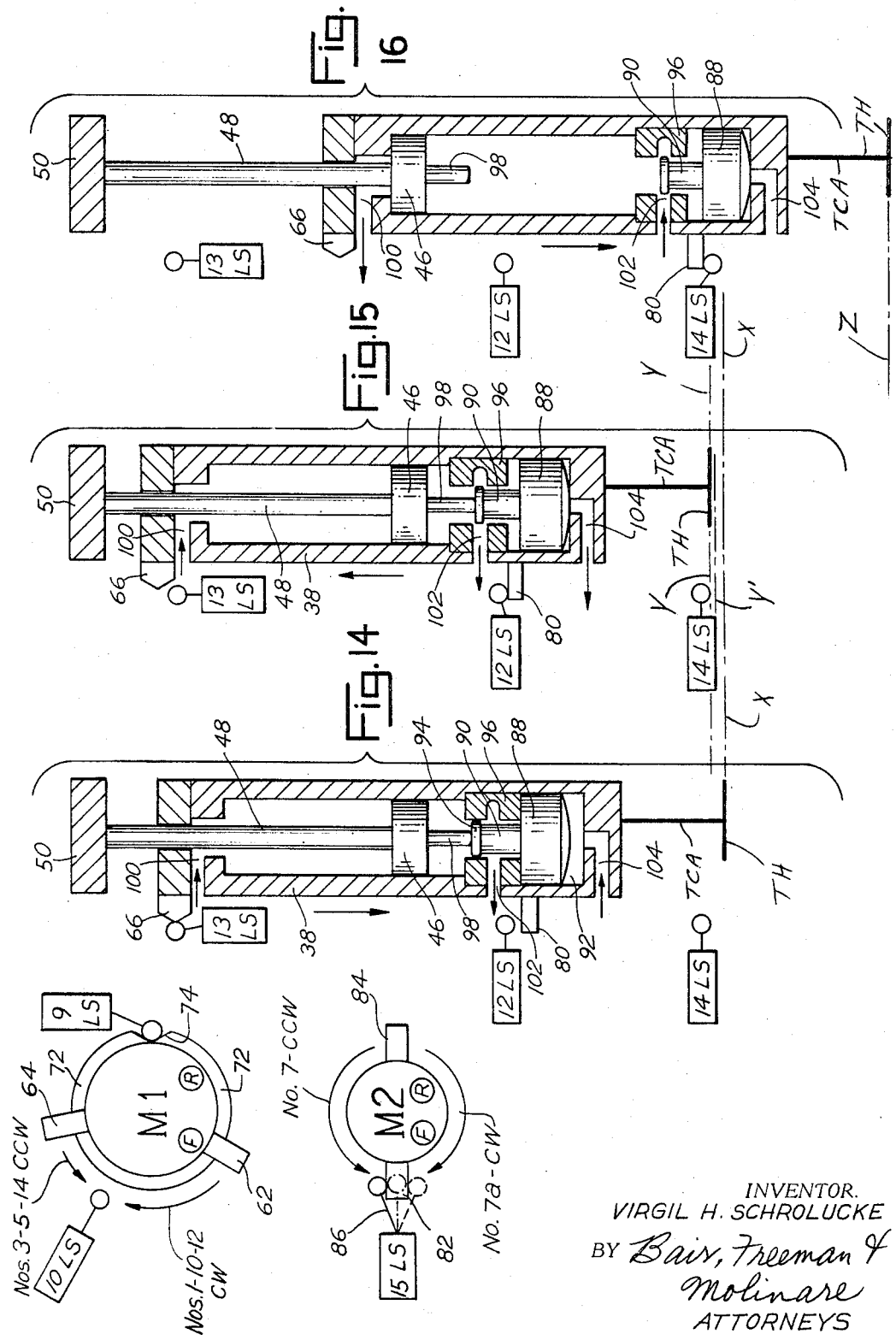

United States Patent Office 3,384,953
Patented May 28, 1968

3,384,953
AUTOMATIC TOOL CHANGER
Virgil H. Schrolucke, Richmond, Ind., assignor to National Automatic Tool Company, Inc., a corporation of Indiana
Filed Sept. 12, 1966, Ser. No. 578,669
7 Claims. (Cl. 29—568)

ABSTRACT OF THE DISCLOSURE

An automatic tool changer in which a supporting shaft is oscillatably mounted on a machine tool and carries a tool carry arm which can slide on the shaft and swing with the shaft from tool storage means to a tool spindle for transferring a tool from one to the other and vice versa. The tool carry arm also has a "Park" position. A hydraulic motor is provided for oscillating the shaft, and hydraulic cylinder and piston means are provided for sliding the tool carry arm along the shaft to normal, tool-lift and tool-extracting positions. A tool handler is mounted on the tool carry arm for oscillation end-for-end and this is accomplished by a second hydraulic motor supported on the tool carry arm. Control means is provided for selectively actuating the hydraulic motors and the cylinder and piston means to effect automatic tool changing.

---

This invention relates to an automatic tool changer for a boring machine or the like of the type that is provided with a tool storage dial which contains a plurality of different tools adapted to be selectively removed therefrom and inserted into the working spindle of the boring machine, the tool changer also being capable of removing a previously used tool from the spindle and returning it to its proper position in the storage dial.

One object of the invention is to provide a tool carry arm for accomplishing the tool changing operation, the arm being horizontally swingable between tool change and tool storage positions, and through an intermediate tool handler park position.

Another object is to provide the tool carry arm vertically movable between upper and lower limits of movement and through an intermediate position to accomplish proper operation of a tool handler carried by the arm so that it may remove and replace tools with respect to the tool storage dial and remove and insert tools with respect to the operating spindle of the boring machine.

Still another object is to provide motors for oscillating the tool carry arm and a tool handler carried by the arm, which motors may be hydraulicly operated, and to provide a cylinder and piston arrangement for reciprocating the arm vertically.

A further object is to provide a tool handler which is operable in three planes, an intermediate plane for parking and swinging to a tool pick-up position at the tool storage dial, a slightly higher plane for picking up the tool and swinging it from the storage dial to the park position whereupon the tool handler may be lowered to the intermediate plane in which it swings to a tool change position for engaging a tool in the spindle and lowering the tool to remove it from the spindle, the tool handler then being in a lower plane where rotation is imparted to it for bringing the removed tool out of alignment with the spindle and bringing another tool that has been removed from the storage dial into alignment with the spindle whereupon the tool handler is elevated for inserting the second tool in the spindle for subsequent operation thereby.

Still a further object is to provide for inserting the tool under strain to hold a shoulder of the tool against the nose of the spindle while a tool retaining operation is being performed whereupon the tool handler is moved down to the intermediate plane and swung back to the park position where it may remain until another tool change operation is desired, or may continue in the upper plane to a position for returning the first tool to the tool storage dial whereupon the tool handler returns to the park position.

An additional object is to provide a series of limit switches actuated at the completion of each step in the entire operating cycle to initiate the next step, the final step resulting in the actuation of a limit switch which stops the operation of the tool changer until such time as an operation starting signal is applied to the tool changer.

Another additional object is to provide the limit switches controlling an electric circuit which in turn controls hydraulic valves for the tool carry arm motor which swings the arm horizontally, the tool handler motor which oscillates the tool handler, and the tool carry arm cylinder and piston mechanism which vertically reciprocates the arm.

With these and other objects in view, my invention consists in the construction, arrangement and combination of the various parts of my automatic tool changer, whereby the objects above contemplated are attained, as hereinafter more fully set forth, pointed out in my claims and illustrated in detail on the accompanying drawings, wherein:

FIG. 1 is a perspective view of an automatic tool changer embodying the present invention;

FIG. 1A is an enlarged vertical sectional view on the line 1A—1A of FIG. 1 showing a cross-section of the edge of a tool storage dial and a tool holder therein together with a portion of a tool handler cooperating with the tool holder;

FIG. 1B is a plan view according to the line 1B—1B of FIG. 1A showing a marginal edge portion of a tool storage dial;

FIGS. 2, 2A and 2B are partial side elevations which together form a complete side elevation of the tool changer, such elevation being from the reverse side with respect to that shown in FIG. 1;

FIG. 3 is a plan view of a portion of FIG. 2B according to the indicating line 3—3 thereof;

FIG. 4 is a reduced vertical sectional view on the lines 4—4 of FIG. 2 and FIG. 2A showing a cylinder and piston arrangement;

FIG. 5 is a reduced horizontal sectional view on the line 5—5 of FIG. 2B and shows a plan view of a tool handler, the figure being turned 90° counter-clockwise in relation to FIG. 2B;

FIG. 6 is a side elevation of FIG. 5, parts thereof being broken away and other parts being shown in section to illustrate details;

FIG. 7 is a reduced horizontal sectional view on the line 7—7 of FIG. 2 to show a limit switch operated by the tool carry arm;

FIG. 8 is a reduced horizontal sectional view on the line 8—8 of FIG. 2A to illustrate a limit switch operated by oscillations of the tool carry arm;

Figure 10:
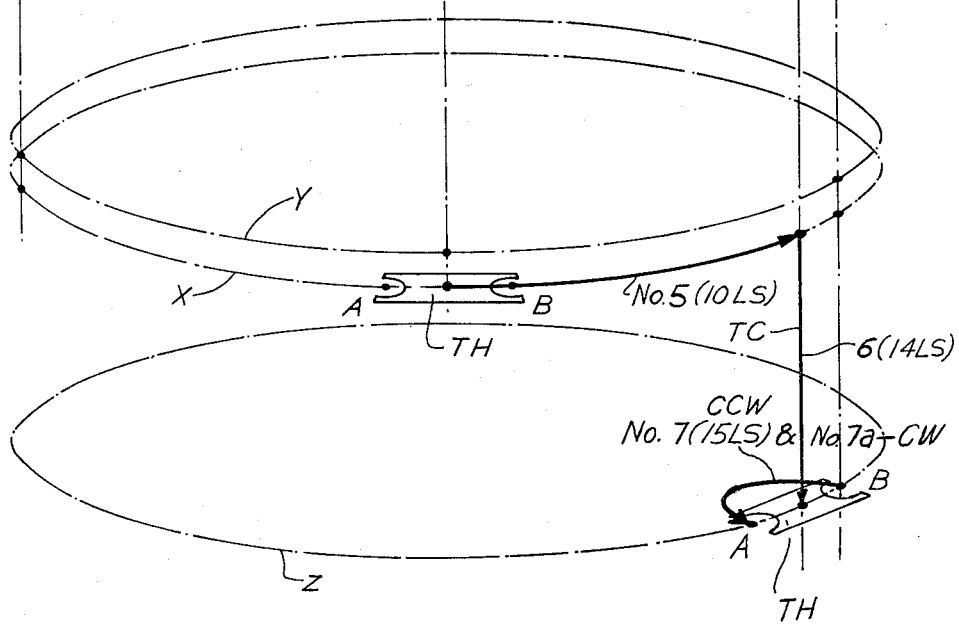

FIG. 10 is a similar diagrammatic view showing also a tool removing and replacing plane of operation for the tool handler and illustrating the tool handler moving from park position to a tool removing position, then down for removing a first tool from the spindle and also illustrates rotation of the tool handler to bring a second tool removed from the storage dial to alignment with the spindle axis;

FIG. 11 is a similar diagrammatic view showing elevation of the tool handler for inserting the second tool in the spindle under upward strain;

FIG. 12 is a similar diagrammatic view showing depression of the tool handler for removing upward strain from the inserted second tool and movement back to park position;

FIG. 13 is a similar diagrammatic view showing a tool storage operation wherein the tool handler moves from park position to the tool storage dial to deposit a previously used tool and then back to park position;

FIG. 14 is another diagrammatic view showing the lifting cylinder for the tool carry arm in an intermediate position, the motors for swinging the tool carry arm and oscillating the tool handler, and limit switches of the tool changer in the positions they assume when the tool carry arm is at the park position and before a tool pick-up cycle is initiated;

FIG. 15 is a similar diagrammatic view showing the cylinder and thereby the tool carry arm in an up position; and FIG. 16 is a similar diagrammatic view showing the cylinder and thereby the tool carry arm in a down position.

On the accompanying drawings there are three elements of major importance which are identified in general as follows:

TH—Tool Handler
TCA—Tool Carry Arm
TSD—Tool Storage Dial

There are also three positions of the tool carry arm identified as follows:

TC—Tool Change Position
THP—Tool Handler Park Position
TS—Tool Storage Position

Two hydraulic torque motors are provided as follows:

M1—Tool Carry Arm Motor
M2—Tool Handler Motor

With respect to specific details of my automatic tool changer, reference is first made to FIGS. 1 through 8. In FIG. 1, a vertical column 20 of a boring machine is illustrated, a boring head 22 being vertically reciprocal thereon. The boring head 22 is provided with a rotating spindle 24 adapted to receive a tool holder shown in general at 26 in which drills, reamers, taps, boring tools or the like are held for rotation by the spindle. In FIG. 1 a drill 28 is illustrated.

My automatic tool changer comprises a vertically elongated base 30 having a pair of bearings 32 and 34 supported thereby and rotatably but nonslidably supporting a tool carry arm shaft 36. The upper end of the tool carry arm shaft 36 is reduced in diameter as indicated at 58 and is operatively connected by a coupling 60 to the motor M1 which is provided for oscillating the tool carry arm.

Figure 2A:
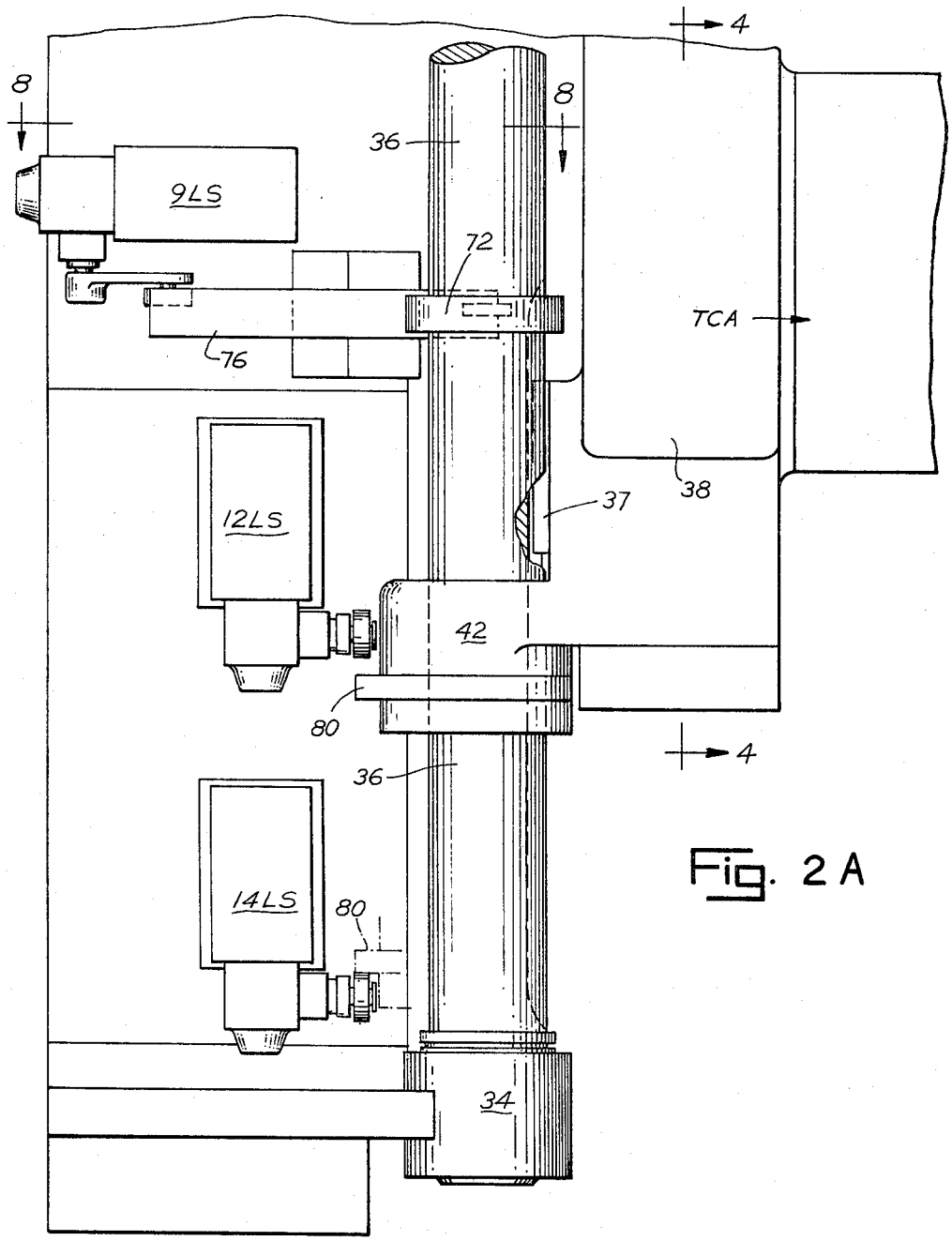

The tool carry arm TCA has a cylinder 38 adjacent the tool carry arm shaft 36 which terminates in upper and lower bosses 40 and 42 vertically slidable on the tool carry arm shaft 36. In FIG. 2A a key 37 is shown cooperating with a keyway in the shaft 36 to prevent rotation of the cylinder 38 and the tool carry arm TCA on the shaft. Referring to FIG. 4 it will be noted that the cylinder 38 has a cylinder sleeve 44 therein in which a piston 46 is reciprocable. A piston rod 48 is secured thereto, extends upwardly therefrom and has its upper end connected to a bracket 50 which is secured to the shaft 36 above the bearing 32. Accordingly, since the shaft 36 is restrained against vertical movement, the sleeve 44, the cylinder 38 surrounding it and the tool carry arm TCA are vertically reciprocable relative to the piston rod 48 and the piston 46 upon the introduction of fluid under pressure to certain ports of the cylinder as will hereinafter appear.

The outer end of the tool carry arm TCA is provided with a sleeve portion 52 in which a tool handler shaft 54 is oscillatable, the lower end of the shaft having the tool handler TH secured thereto as by a nut 55 and the upper end of the shaft being connected to a motor shaft 56 of a tool handler motor M2.

Six limit switches 10LS, 13LS, 9LS, 12LS, 14LS, and 15LS are illustrated, all six throughout FIGS. 2, 2A and 2B, and three of the six in FIGS. 3, 7 and 8. All six are shown diagrammatically in FIG. 14.

Referring to FIGS. 2 and 7 the limit switch 10LS is adapted to be actuated by fingers 62 and 64 of the tool carry arm TCA. Adjustable contact screws 62a and 64a are carried by the fingers to coact with the limit switch 10LS.

The limit switch 13LS is adapted to be actuated by a cam 65 shown in FIG. 2 and diagrammatically in FIG. 14, the cam being secured to the boss 40 of the cylinder 38. Actuation is accomplished by a slidable plunger 70 as an operative connection between the cam 66 and the actuating arm of the limit switch 13LS.

The limit switch 9LS as shown in FIGS. 2A and 8 and diagrammatically in FIG. 14 is actuated by a cam 72 and provided with a notch 74 which permits the switch 9LS to assume a normal position except when the cam 72 is rotated out of the position shown in FIGS. 8 and 14. The cam 72 is secured to the tool carry arm shaft 36 and when it is in a normal position as shown, the cam notch 74 permits a normal position for the limit switch, but whenever the shaft is rotated away from the normal position, a pivoted lever 76 is actuated against the action of a spring 78 to permit the limit switch 9LS to move to a non-normal position.

It will be noted in FIGS. 7 and 8 that the limit switches 10LS and 9LS are mounted on the base 30, and the limit switches 13LS, 12LS and 14LS are also mounted on this base. The limit switch 12LS is located above the limit switch 14LS, and both of these switches are adapted to be actuated by a flange 80 carried by the boss 42 of the tool carry arm TCA so that at an upper limit of movement of the tool carry arm the switch 12LS is actuated and at a lower limit of movement thereof the limit switch 14LS is actuated. In FIG. 2A the flange 80 is shown by dot-and-dash lines in a position about to actuate the limit switch 14LS.

Referring to FIGS. 2B and 3 the limit switch 15LS is adapted to be actuated in one direction by an arm 82 and in the opposite direction by an arm 84. The arms 82 and 84 are provided with adjustable contact screws 82a and 84a. A limit switch actuating lever 86 has a normally centered position illustrated by dot-and-dash lines in FIG. 14, and is actuated to the position shown in FIG. 3 and by solid lines in FIG. 14 by the screw 82a, and to a substantially 180° opposite position (shown dotted in FIG. 14) by the screw 84a of the arm 84.

Referring again to FIG. 4 a second piston 88 having a post 90 is reciprocable in a second cylinder sleeve 92 in the cylinder 38 of the tool carry arm TCA and is adapted at times to contact the lower end of an extension 98 downwardly from the piston rod 48 (see also FIGS. 14, 15 and 16). The piston 88 has a flange 94 which is a working fit in the bore of an insert 96 located in the adjacent ends of the cylinder sleeves 44 and 92. Ports 100, 102 and 104 lead to the upper end of the cylinder 38, the bore of the insert 96 and the lower end of the cylinder 92 respectively and are adapted to receive and discharge fluid pressure as explained below. It will be noted the flange 94 is narrower than the port 102 so that when in alignment therewith (FIG. 15) hydraulic fluid may flow toward or from the lower face of the piston 46 and the upper face of the piston 88, but when in the position illustrated in FIG. 14 it reduces flow between the port 102 and the lower face of the piston 46.

The tool handler TH as shown in FIGS. 5 and 6 comprises an arm 106 having a pair of oppositely disposed tool holder receptors 108 secured thereto, one being identified A and the other B or, in other words, the A end and the B end of the tool handler.

The cylinder and piston arrangement shown diagrammatically in FIGS. 14, 15 and 16 is a 3-position combination, FIG. 14 illustrating an intermediate position of the cylinder 38 and thereby the tool carry arm TCA, FIG. 15 illustrating an up position and FIG. 16 illustrating a down position.

When the cylinder and arm are in the intermediate position of FIG. 14, hydraulic pressure is provided at ports 100 and 104, and port 102 returns to tank. Accordingly, the cylinder 38 is being forced downwardly relative to the piston rod 48 by the fluid pressure entering the port 104 in opposition to fluid pressure entering the port 100. It will be noted the piston 88 has a larger diameter than the piston 46 and therefore the piston 88 is forced from its upper limit of FIG. 15 to the intermediate position shown in FIG. 14 where it is stopped by the upper surface of the piston 88 engaging the insert 96 while the pressure entering at the port 100 holds the piston 88 up at this limit and against the force of gravity acting on the piston and the tool carry arm TCA. Thus, the intermediate position is defined.

When the cylinder is in the up position of FIG. 15, hydraulic pressure is provided at port 100, and ports 102 and 104 return to tank. Since the port 104 is now returned to tank, the hydraulic pressure under the piston 88 is released so that the pressure still entering the port 100 lifts the cylinder 38 and the tool carry arm. Since the flange 94 is now centered in the port 102 it permits free flow of hydraulic pressure from between the pistons 46 and 88. The relative external size of the flange 94 and the internal size of the insert 96 are such as to produce a regulated speed of lift from the intermediate position of FIG. 14 to the up position of FIG. 15.

When the cylinder is in the down position of FIG. 16, hydraulic pressure is provided at port 102, and port 100 returns to tank. Flow of hydraulic fluid into the port 102 acts on the lower surface of the piston 46 for forcing the cylinder 38 downwardly to its lower limit of movement determined by engagement of the top of the piston 46 against the upper head of the cylinder 38 as shown, the outflow of hydraulic fluid from the port 100 taking care of the displacement of fluid by the upper surface of the piston.

The tool holder 26 shown in FIG. 1A is of the general type shown in Penland Patent No. 3,115,348 and has a spindle engaging flange 110 and a tool dial engaging flange 112, the latter having a beveled lower edge. The tool storage dial has a pair of flanges 111 and 113. The lower flange 111 has a semi-circular seat 114 for the flange 110 of the tool holder 26 and the upper flange 113 has a semi-circular seat 115 provided with a countersunk edge 116 for the beveled lower edge of the flange 112 of the tool holder as shown in FIG. 1A. The countersink extends slightly more than 180° as shown in FIG. 1B to retain the tool holder in position once the flange 112 is lowered into contact with the edge 116.

Each tool holder receptor 108 is likewise provided with a semi-circular notch 118 adapted to receive a cylindrical portion 110a of the tool holder directly below the flange 110 as shown in FIG. 1A and a semi-circular seat 120 extending slightly more than 180° to retain the flange 110 in the seat 120 once the receptor is raised from the position of FIG. 1A to a position with the seat 120 receiving the flange 110. Thus the tool holder may be lifted and then withdrawn from the tool storage dial TSD and subsequently may lower another tool into position so that the storage dial retains it. Thus each tool holder receptor 108 may be engaged with a tool holder when in the position shown in FIG. 1A and then elevated to receive and hold the tool holder while lifting it from the dial, and may return the tool to the dial by a reversal of the steps just enumerated.

As shown in FIGS. 5 and 6 the sleeve portion 52 on the outer end of the tool carry arm TCA is provided with a pair of hardened stops 122 and the tool carry arm itself is provided with a pair of contact screws 124 and 126 adapted to coact therewith at opposite limits of 180° of rotation of the tool handler TH relative to the tool carry arm TCA.

Figure 9:
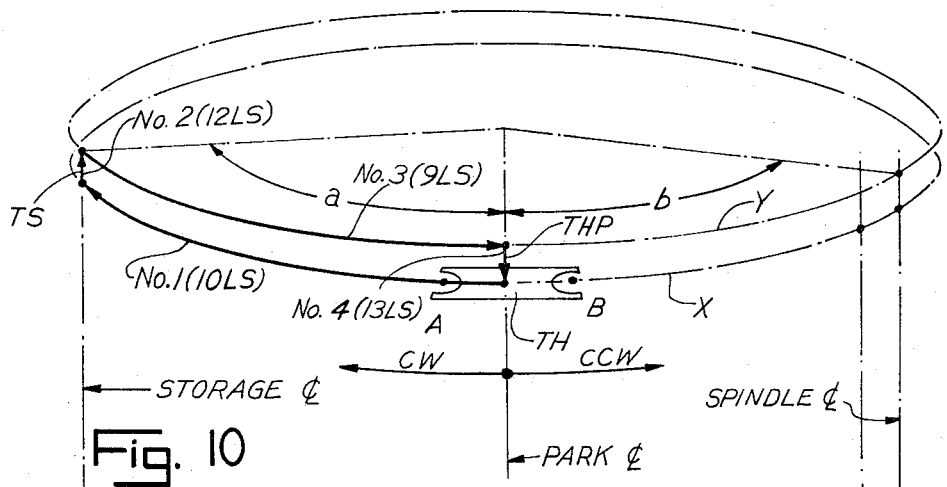
FIG. 9 is a diagrammatic view showing two planes in which the tool handler operates and illustrating the movement thereof from a tool handler park position to a tool storage position and back to the park position.

The various limit switches illustrated control solenoid valves of a pressurized hydraulic system having the usual supply and return pipes adapted to actuate the torque motors M1 and M2, and the cylinder and piston mechanism illustrated in FIG. 4. Electric circuitry as well as hydraulic circuitry of this type are well-known in the machine tool art and form no part of my present invention and accordingly are not illustrated in detail. Instead, FIG. 14 illustrates diagrammatially the torque motors and the cylinder-piston actuator for the tool carry arm and the tool handler, the limit switches being illustrated in normal positions as assumed when the tool carry arm is in the tool handler park position indicated at THP in FIG. 9. FIG. 9 also shows the tool storage position TS, and that the tool carry arm is adapted to be swung through an angle A from the tool handler park position THP to the tool storage position TS and through an angle B from the tool handler park position THP to the tool change position TC, and FIG. 10 shows the tool change position TC.

The hydraulic torque motors M1 and M2 may have suitable cams and deceleration valves in the usual manner to control the speed of the tool carry arm TCA and the tool handler TH, and to cushion their limits of movement against their respective stops. This type of control is common in the art and no attempt has been made to illustrate them.

PRACTICAL OPERATION

Referring to FIG. 9 and assuming that the tool carry arm TCA is at tool handler park position THP, it will be noted that the tool handler TH is in an intermediate plane X just below a plane Y. The limit switch 9LS is in the position shown in FIGS. 8 and 14 which results in stoppage of the swinging of the tool carry arm in the park position. A complete tool change cycle involves three subcycles as follows:

I. *Tool pick-up subcycle*

II. *Tool change subcycle*

III. *Tool put-away subcycle*

Using the following terminology for purposes of simplification:

PARK—Tool Handler Park Position
ARM—Tool Carry Arm
DIAL—Tool Storage Dial
HANDLER—Tool Handler
TOOL—Tool Holder and Tool
CW—Clockwise
CCW—Counter-Clockwise the three subcycles are briefly outlined herebelow under the heading "COMPLETE CYCLE OF OPERATION" and with particular reference to FIGS. 9 to 13 inclusive. There are 14 operations numbered 1 to 14 beginning in FIG. 9 and ending in FIG. 13. Each operation number is followed by the limit switch in parentheses which is operated at the end of the numbered operation. The planes X, Y and Z correspond to the intermediate, up and down positions of FIGS. 14, 15 and 16 respectively.

COMPLETE CYCLE OF OPERATION

*I. Tool pick-up subcycle (FIG. 9)*

(1) From PARK, ARM swings CW to DIAL (TS) (operates 10LS which raises ARM from X to Y)
(2) ARM moves up picking up TOOL in A end of HANDLER (operates 12LS which causes ARM to swing CCW)
(3) ARM swings CCW to PARK (THP) (operates 9LS which lowers ARM from Y to X)
(4) ARM moves down (operates 13LS which stops operation of tool carry arm TCA pending a further command)

II. Tool change subcycle (FIGS. 10, 11 and 12)

(5) From PARK (FIG. 10), ARM swings CCW until B end of HANDLER corresponds to center line of spindle, axis of HANDLER now being at tool change position TC (operates 10LS which lowers ARM from X to Z)

(6) ARM moves down and B end of HANDLER strips TOOL from spindle if there is one (operates 14LS which rotates HANDLER)

(7) HANDLER rotates 180° to move B end away from spindle axis and substitute A end with the TOOL carried thereby (operates 15LS which raises ARM from Z to near Y)

(8) ARM moves up (FIG. 11) inserting TOOL carried by A end of HANDLER into spindle and under strain (at position Y' instead of going all the way up to Y, also see FIG. 14) holds flange 110 of tool holder 26 against nose of spindle. The spindle may be provided with automatically operable locking and unlocking mechanism for the tool holder 26 such as shown in the Penland patent hereinbefore referred to and which mechanism is operated for releasing the tool holder before operation No. 6 of FIG. 10, and locking it again after operation No. 8 (operates 12LS which lowers ARM from Y' to X)

(9) ARM moves down from Y' to X (FIG. 12) to release the upward strain of A end of HANDLER from the TOOL in the spindle (operates 13LS which causes ARM to swing CW)

(10) ARM swings CW to PARK (THP) (operates 9LS which stops operation of tool carry arm TCA pending a further command)

III. Tool put-away subcycle (FIG. 13)

(11) At PARK, ARM moves up from X to Y so that tool carried by B end of HANDLER will be in the elevated position shown by dot and dash lines in FIG. 1A high enough for the flange 112 to clear the upper surface of the tool storage dial flange 113 (operates 12LS which causes ARM to swing CW)

(12) ARM swings to DIAL (operates 10LS which lowers ARM from Y to X)

(13) ARM moves down depositing TOOL in DIAL (operates 13LS which causes ARM to swing CCW)

(14) ARM swings CCW to PARK (operates 9LS which stops operation of tool carry arm TCA pending a further command)

In order to accurately position the axis of a tool carried by the tool handler in alignment with the spindle of the boring machine, the head 22 of the machine may be provided with a vertical track 128 as shown in FIG. 1 and the tool carry arm TCA with a roller 130 to ride therealong during the vertical movements of the tool carry arm. The fluid to the reverse port R of the motor M1 shown in FIG. 14 furnishes hydraulic pressure to hold the roller 130 under strain against the track 128. The tool carry arm TCA is similarly accurately positioned when it is swung to the tool storage dial TSD by means of an adjustable stop screw 131 shown in FIG. 2B engaging the frame of the tool storage dial whereupon fluid to the forward port F of the motor M1 furnishes hydraulic pressure to hold the stop screw 131 against the frame of the tool storage dial. FIG. 14 also shows a forward port F for the motor M1 and forward and reverse ports for the motor M2 diagrammatically and further shows some of the numbered operation 1 through 14 and indicates those which apply to the clockwise and counterclockwise rotation of the motors M1 and M2, 7a representing reverse oscillation of the tool handler which is shown as rotating counterclockwise in FIG. 10.

In a machine tool of the general kind herein disclosed, the tool storage dial TSD is rotated by automatic means to bring the proper tool to the tool handler for a given machining operation, and the subcycles described are performed in accordance with a control tape or card which also positions the work with respect to the tool in the spindle as disclosed in Morgan Reissue Patent No. 25,812. My present invention is not concerned with such automatic operation but with the type of tool change mechanism herein disclosed and comprising the tool carry arm for supporting the tool handler and moving it in accordance with the diagrammatic showings in FIGS. 9 to 13 inclusive for accomplishing either the complete cycle of operation in accordance with a control tape or card, or any one of the three subcycles as required. Such machines are also usually provided with manual controls to perform any one or portions of the subcycles for setting-up purposes or for any other reason during the process of machining a workpiece.

From the foregoing specification it will be obvious that I have provided a comparatively simple tool carry arm with a means to swing it and vertically reciprocate it, the tool carry arm having a tool handler which is operable to remove one tool and insert another by means of oscillating, raising and lowering actions. FIG. 9 illustrates counterclockwise oscillation whereas during the next complete cycle of operation the oscillation would be clockwise so as to have the A end of the tool handler, which would then be in the position of FIG. 11, remove a tool from the spindle and position a tool in the B end thereof in alignment with the spindle for insertion of that tool. The electrical and hydraulic circuits, of course, are set up to accomplish this result.

Some changes may be made in the construction and arrangement of the parts of my automatic tool changer without departing from the real spirit and purpose of my invention, and it is my intention to cover by my claims any modified forms of structure or use of mechanical equivalents which may reasonably be included within their scope.

I claim as my invention:

1. In an automatic tool changer for a machine tool having a tool spindle and a tool storage means associated with said machine tool,
   wherein the axes of the tools in said tool storage means are parallel to said machine tool spindle,
   a supporting shaft oscillatably mounted on said machine tool with its axis parallel to said tools in said tool storage means and said tool spindle,
   a hydraulic motor for oscillating said shaft,
   a tool carry arm slidably mounted on said supporting shaft,
   hydraulic cylinder and piston means for sliding said tool carry arm along said shaft to a normal position,
   a tool-lift position above said normal position and
   a tool-extracting position below said normal position,
   a tool handler carried by said tool carry arm and having opposite sockets to engage a tool in said tool storage means and a tool in said tool spindle,
   a second hydraulic motor supported on said tool carry arm and operatively connected with said tool handler to oscillate it end-for-end,
   and control means for selectively actuating said hydraulic motors and said cylinder and piston means.

2. An automatic tool changer in accordance with claim 1 wherein said cylinder and piston means comprises a cylinder,
   a first piston therein,
   said first piston and said cylinder being relatively movable through said normal position and between limits defining said tool-lift position and said tool-extracting position,
   a second piston in said cylinder,
   said second piston and said cylinder being relatively movable between limits defining said normal position and said tool-lift position,
   said second piston being independent of said first piston and engageable therewith to define said normal position for said first piston when said second piston is at said normal limit position and for permitting said first piston to assume its tool-lift limit position when said second piston is at its tool-lift limit position.

3. An automatic tool changer in accordance with claim 2
wherein said cylinder is provided with an insert between said first and second pistons,
and with first and second ports for in-flow and out-flow of hydraulic fluid at the ends of said cylinders,
said insert having a third port for in-flow and out-flow of hydraulic fluid,
and means between said first and second pistons to restrict the flow of hydraulic fluid from said third port when said first and second pistons are in said normal position,
to permit free flow of hydraulic fluid from said third port when said first and second pistons are in said tool-lift position and to permit free flow of hydraulic fluid to said third port when said first and second pistons are in said tool-extracting position.

4. An automatic tool changer in accordance with claim 2
wherein said means to restrict the flow of hydraulic fluid comprises a passageway in said insert between said first piston and said third port,
and loosely fitting plug means carried by one of said pistons and located in said passageway when said pistons are in said normal position and out of said passageway when said first piston is in either its tool-lift position or its tool-extracting position and the second piston is in its tool-lift and tool-extracting position.

5. An automatic tool changer in accordance with claim 1
wherein said tool carry arm has a park position intermediate said tool storage means and said tool spindle,
a limit switch and circuitry therefor to stop operation of said first mentioned hydraulic motor when said limit switch is actuated,
and cam means carried by said supporting shaft to actuate said limit switch at said park position.

6. An automatic tool changer in accordance with claim 1
wherein said tool handler so cooperates with a tool when it is being inserted into said tool spindle as to move said tool from said tool-extracting position toward but short of said tool-lift position,
whereby said hydraulic cylinder and piston means is stopped short of said tool-lift position to effect such insert under strain produced by operation of said hydraulic cylinder and piston means.

7. An automatic tool changer in accordance with claim 2
wherein said tool handler so cooperates with a tool which it is being inserted into said tool spindle as to move said tool from said tool-extracting position toward but short of said tool-lift position
whereby said first and second pistons are stopped short of said tool-lift position to effect such insertion under strain produced by hydraulic fluid under pressure entering said cylinder to move said pistons toward their tool-lift positions.

References Cited

FOREIGN PATENTS 947,743  12/1961  Great Britain.

RICHARD H. EANES, JR., *Primary Examiner.*